United States Patent [19]

Cole

[11] 4,422,986

[45] Dec. 27, 1983

[54] METHOD AND APPARATUS FOR INFECTION MOLDING BRUSHES

[76] Inventor: William E. Cole, Residence Europea, Monte Carlo, Monaco

[21] Appl. No.: 304,836

[22] Filed: Sep. 23, 1981

[51] Int. Cl.$^3$ .............................................. B28B 7/04
[52] U.S. Cl. .................... 264/39; 249/129; 249/160; 264/243; 264/334; 425/444; 425/805
[58] Field of Search ............... 425/805, 444; 249/160, 249/129; 264/243, 39, 334

[56] References Cited

U.S. PATENT DOCUMENTS 3,357,058 12/1967 Kutik ............................. 425/805 X

FOREIGN PATENT DOCUMENTS 42-25775 12/1967 Japan ................................. 425/805
311149 1/1956 Switzerland ....................... 425/805

*Primary Examiner*—Donald E. Czaja
*Assistant Examiner*—James C. Housel
*Attorney, Agent, or Firm*—Lerner, David, Littenberg, Krumholz & Mentlik

[57] ABSTRACT

The injection molding of brushes, particularly miniature brushes such as for the application of cosmetics, is carried out in a mold in which each of the cavities defining the bristles is defined by a plain surface of one mold piece and a grooved surface of another mold piece. The mold pieces are clamped together and a brush is formed by injection molding. An ejector rod facilitates removal of the molded brush from the mold, thus making it unnecessary to separate the mold pieces to remove the molded brush. However, the mold pieces may be unclamped and separated to allow the mold to be cleaned of foreign matter or broken bristles.

5 Claims, 10 Drawing Figures

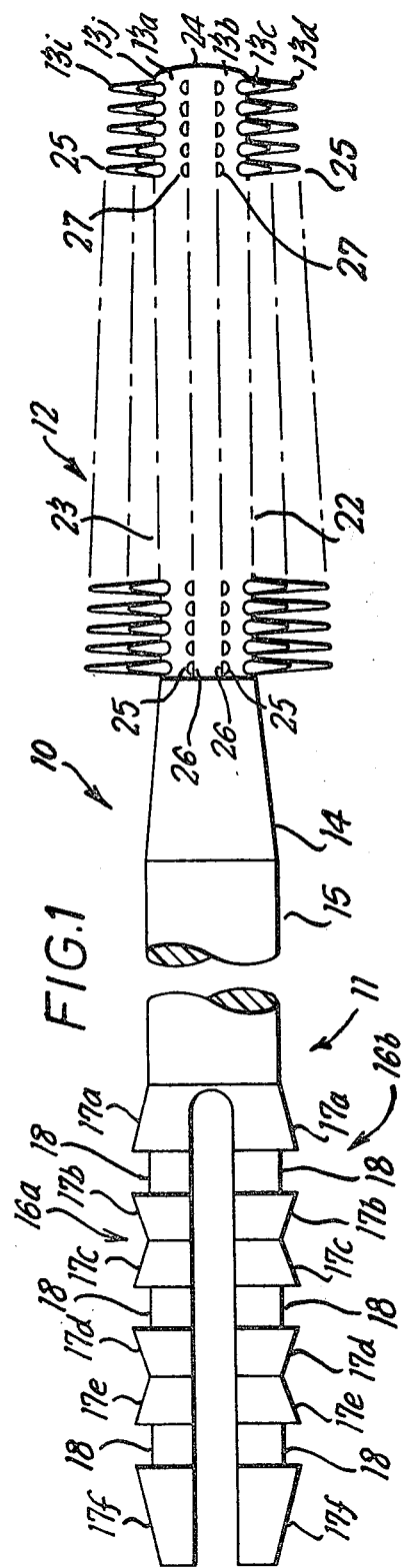
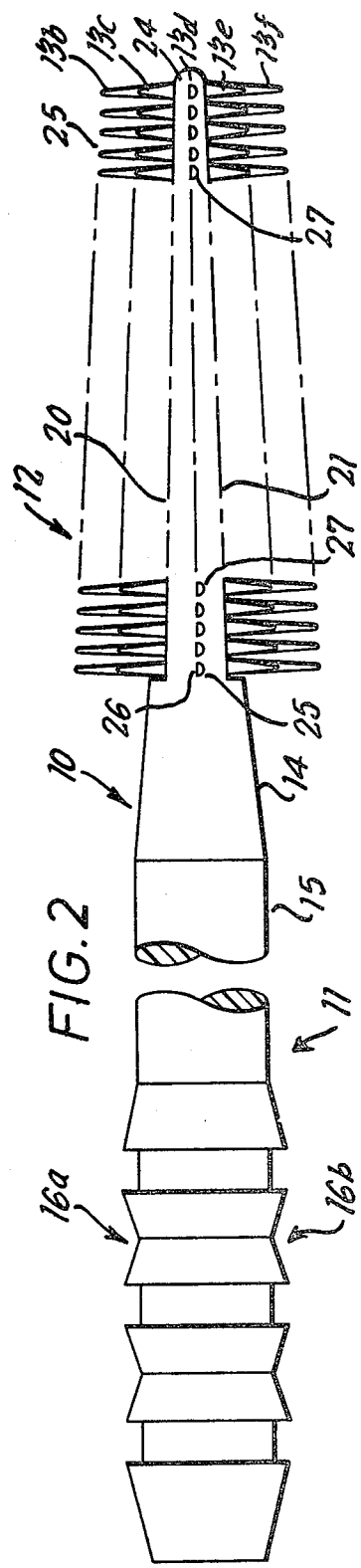

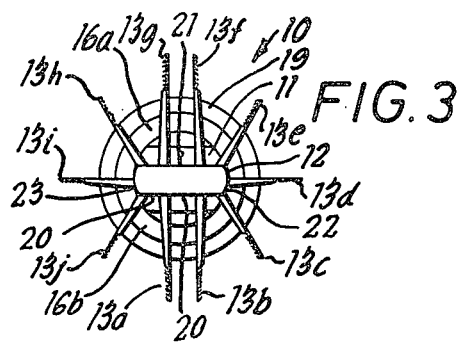
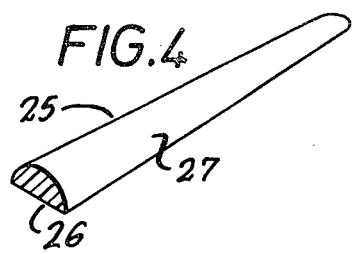
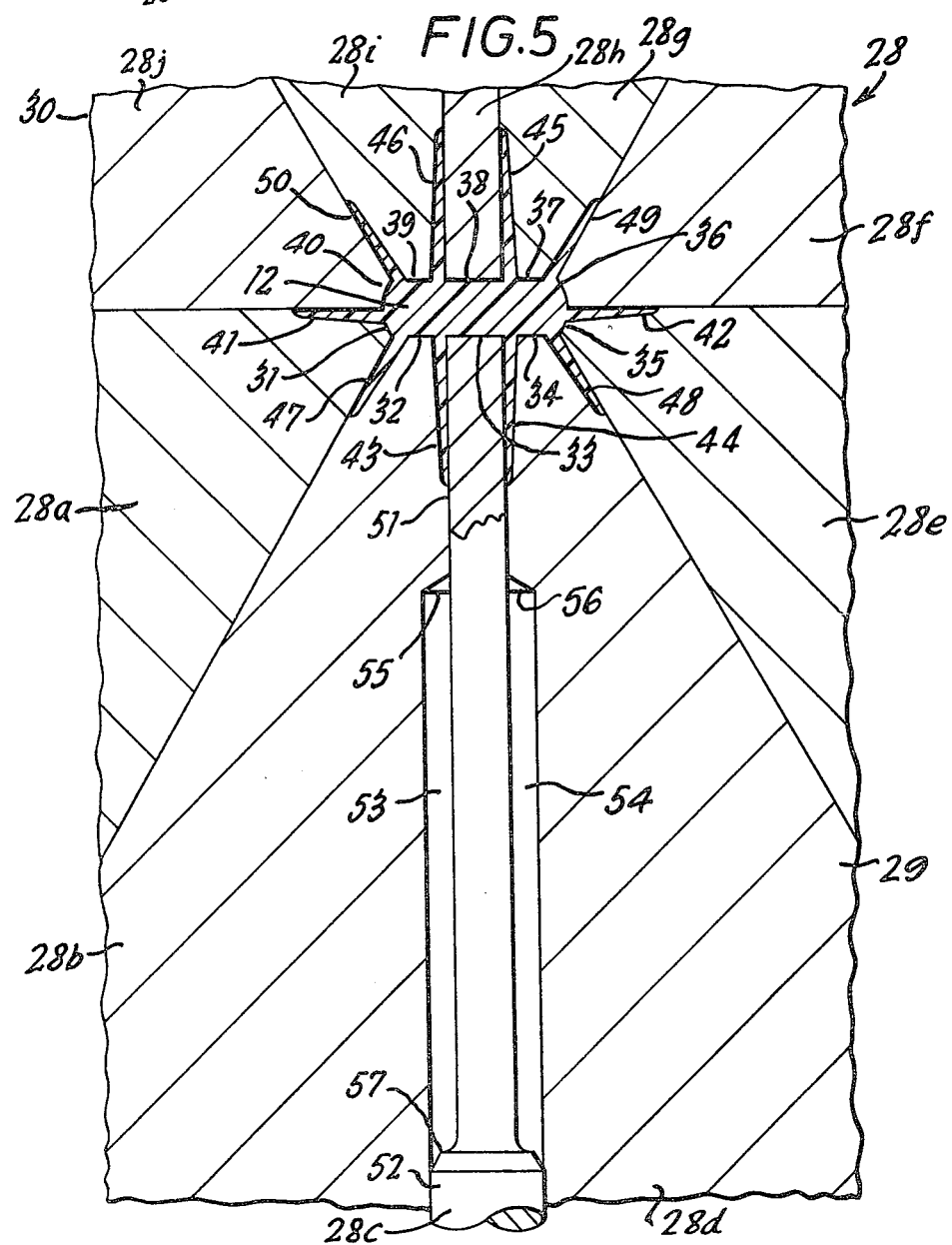

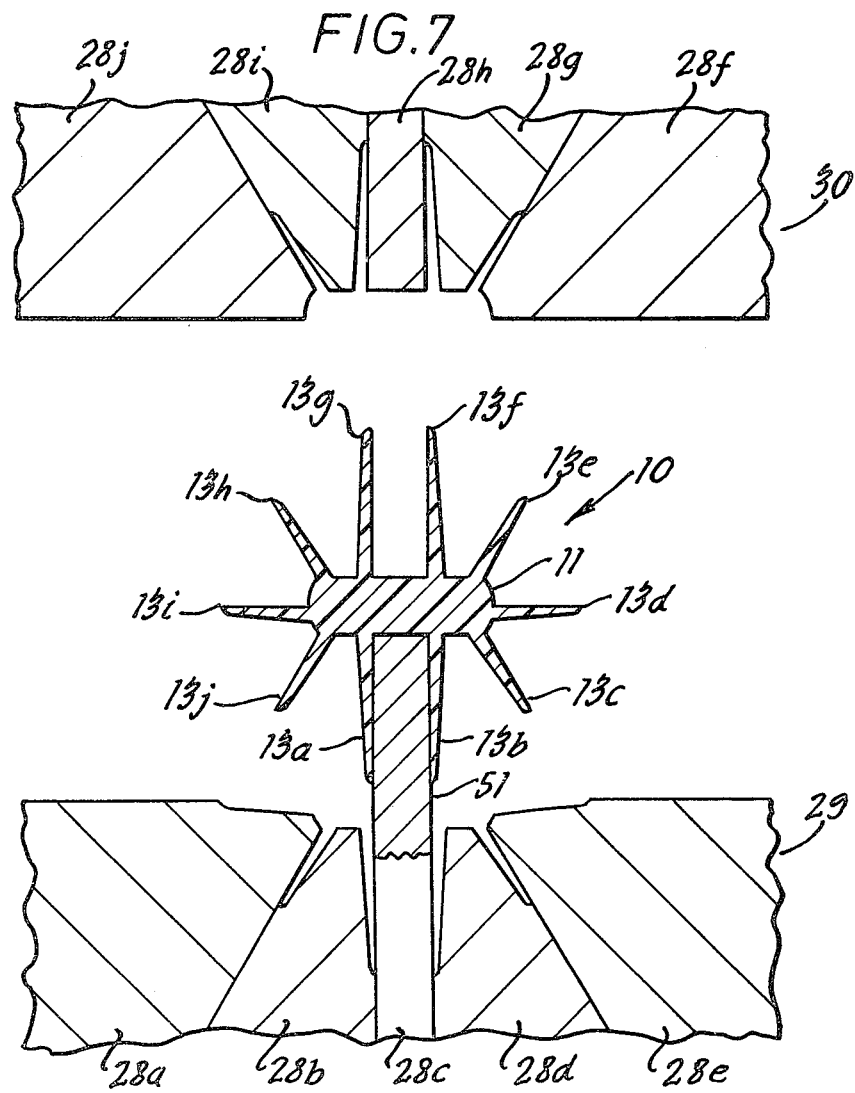

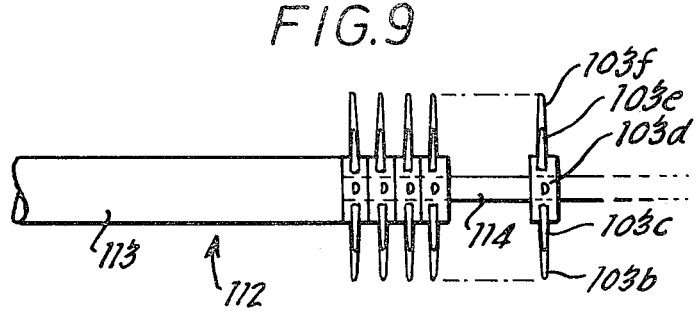
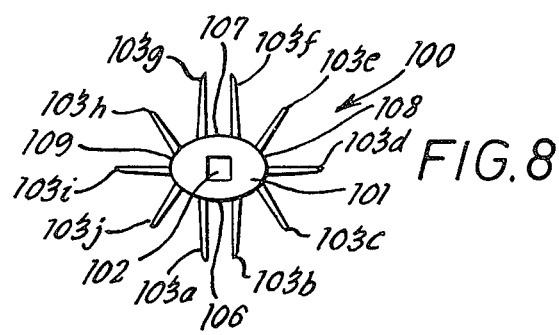
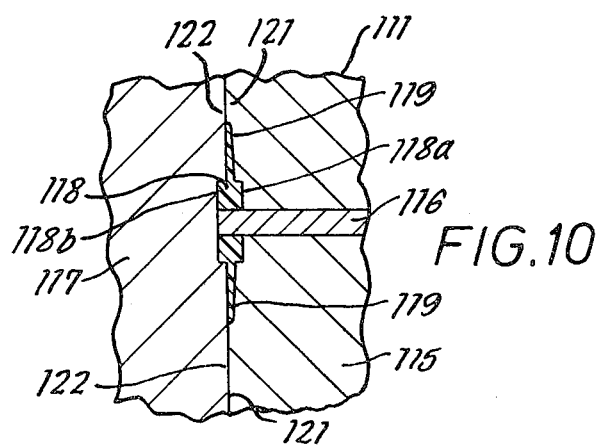

METHOD AND APPARATUS FOR INFECTION MOLDING BRUSHES

The present invention relates to the manufacture of brushes.

It is already known to manufacture brushes or brush heads by an injection moulding technique in which the bristles of the brush are integrally formed with a support member carrying the bristles, which support may be subsequently attached to a separate handle or may also have the handle integrally formed with it. These techniques have, however, only been applied to the manufacture of relatively large brushes, such as scrubbing brushes or hair brushes. Minature brushes, such as brushes for applying make-up, (e.g. mascara) have so far been manufactured by a process which involves first separately forming the bristles and a wire stem in the shape of a hair pin, assembling the bristles manually with the stem with the bristles located between the two limbs thereof, and twisting the stem to secure the bristles thereto, the stem thus forming a support for the bristles which can be attached to a handle. It has not been possible, so far, to apply the injection moulding technique to such minature brushes in view of the expense involved in forming a mould made up of a large number of minature bores for defining the bristles and in view of the difficulty which would be involved in extracting a broken bristle from such a bore, such breakage being likely to be a frequent occurrence to the delicate nature of the bristles.

The present invention, therefore, is concerned particularly but not exclusively with the problem of injection moulding miniature brushes or brush heads.

According to one aspect of the present invention, a mould for injection moulding at least a part of a brush, preferably a miniature brush, including cavities for defining the brush bristles, each cavity being defined between a recess in a surface of a first mould member and a plain surface of a second mould member.

In a preferred embodiment, the first and second members define between them a row of cavities each for forming a respective different bristle of the brush head, the first member having a plurality of said recesses in a row and the second member having a plain surface which cooperates with said plurality of recesses to form said plurality of cavities. A row of recesses may be formed relatively easily, for example by an etching technique, and the plain surface of course may also be formed relatively easily. Since there are only recesses in one of the members, there is no need for exact registration between the two members and, in the event that a bristle breaks in one of the cavities, the members can fairly easily be separated to enable the bristle to be removed.

In a particularly preferred embodiment, the mould is provided with a plurality of rows of said bristle defining cavities, the mould thus comprising a plurality of said members, the row further including a cavity for defining a support for said bristles so that a complete brush head may be formed in a single injection moulding operation.

Suitably the width of each recess in the mould member tapers inwardly from its base to its tip and conveniently the length of the bristle recesses in each row decreases from one end of the support cavity to its tip.

According to one aspect of the present invention, a brush produced by injection moulding includes a head having individual bristles integral with, and projecting outwardly from, the periphery of the head, each bristle being formed with a longitudinally extending flat face.

Preferably the bristles are arranged in at least two rows extending longitudinally along the periphery of the head.

In one embodiment of the invention the brush is provided with a stem which is integral with the head.

In this case the length of the bristles in each row may decrease from the end of the head to its tip.

In another embodiment of the invention the brush is provided with a head comprising a number of elements produced by injection moulding, each element having a central boss provided with a bore and individual bristles integral with and projecting outwardly from the periphery of the boss, the elements being fitted onto a brush stem by way of the bores.

Preferably the cross-section of each bristle tapers inwardly from its base to its tip.

Suitably the end of the stem is adapted for communication to a handle or cap.

According to a further aspect of the present invention, a brush head element produced by injection moulding comprises a central boss having a bore for enabling the element to be fitted onto a brush stem and individual bristles integral with and projecting outwardly from the periphery of the boss.

Preferably each bristle is formed with a longitudinally extending flat face.

Suitably the bore is shaped to cooperate with the stem in a manner to prevent rotation of the element about the stem axis. In this case the bore and the stem may be rectangular.

Conveniently the boss has flat opposed faces.

Preferably the cross-section of each bristle tapers inwardly from its base to its tip.

According to yet another aspect of the present invention, a mould for producing a brush head element by injection moulding comprises portions engageable to define a cavity for forming a central boss having a bore and cavities communicating with the boss-forming cavity and arranged to form individual bristles, the bristle-forming cavities, in use, projecting outwardly from the periphery of the boss-forming cavity.

Preferably the mould portions have engaging surfaces which are adapted to form the bristle cavities therebetween. Suitably the mould portions have engaging surfaces adapted so that each bristle cavity is formed between a recess in the surface of one mould portion and a plain surface of an adjacent mould portion. In one embodiment of the invention, the mould includes two mould portions having engaging surfaces adapted to form the boss-cavity and bristle cavities therebetween.

Conveniently, a further mould portion is provided for location in a bore in one of the mould portions, the bore, in use, communicating with the boss-cavity so that the end of the further mould portion can be inserted into the boss cavity to form the boss bore.

Preferably the cross-section of each bristle cavity tapers inwardly from the base to its tip.

Embodiments of the invention will now be described with reference to the accompanying drawings, in which:

FIG. 1 is a side view of a brush according to one embodiment of the present invention;

FIG. 2 is a further side view of the brush shown in FIG. 1 rotated 90° about its axis;

FIG. 3 is an end view of the brush shown in FIGS. 1 and 2 with a handle attached;

FIG. 4 is a perspective view of a bristle;

FIG. 5 is a transverse section through part of an assembled mould for producing the brush;

FIG. 7 is a section through the mould shown disassembled for removal of the brush;

FIG. 8 is a front view of a brush head element according to another embodiment of the present invention;

FIG. 9 is a side view of the brush head element of FIG. 7, several such elements being shown assembled on a brush stem; and FIG. 10 is a longitudinal section through part of an assembled mould for producing the brush head element.

Figure 6:
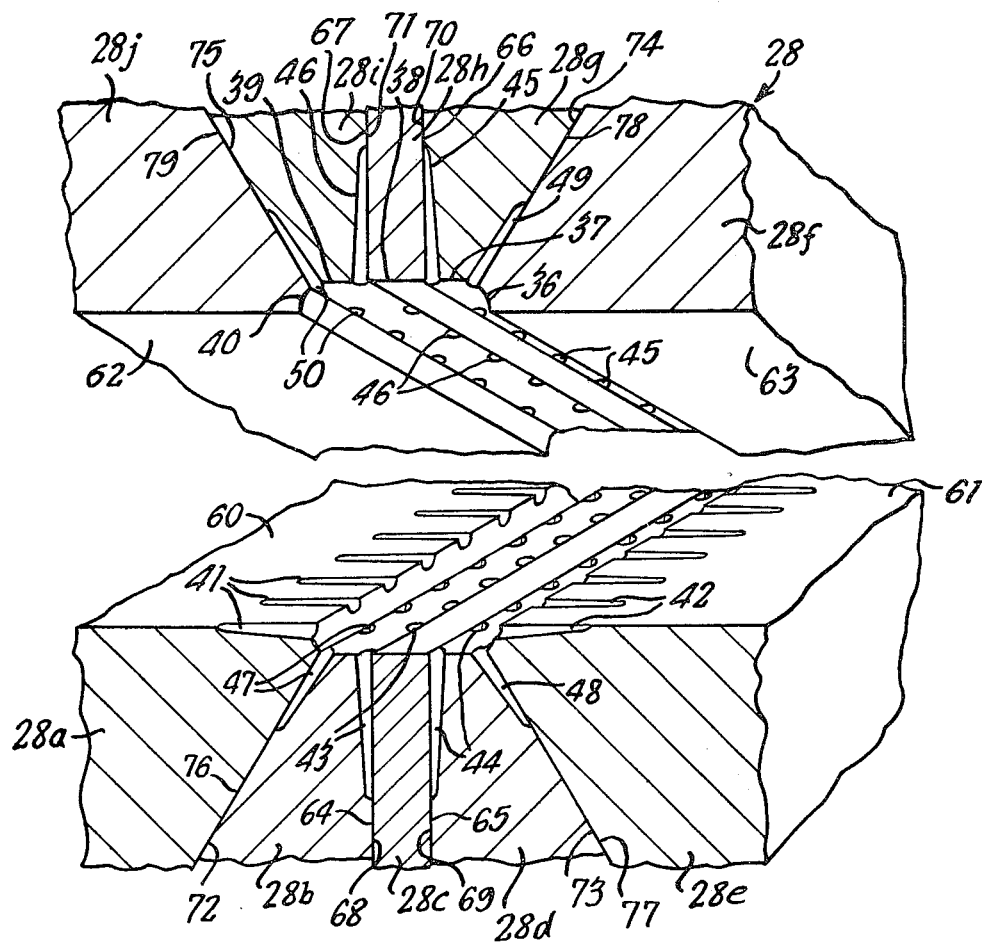
FIG. 6 is a perspective view of part of the mould in the disassembled condition.

Referring to the drawings, the brush 10 shown in FIGS. 1 to 3 is injection moulded from a suitable synthetic plastics material and comprises a stem 11, a head 12 integral with the stem 11 and ten rows of bristles 13a to 13j extending longitudinally of the head 12.

The stem 11 is connected to the head 12 by means of a cylindrical neck portion 14 which tapers outwardly towards a cylindrical body portion 15. The body portion 15 is connected to identical spaced end portions 16a and 16b extending parallel to each other. The portions 16a and 16b are each provided with arcuate lugs 17a and 17f in the form of truncated conical part-annuli, each lug 17 facing in a direction opposite to its neighbour and two pairs of lugs 17b and 17c and 17d and 17e adjoining each other. The pairs of lugs 17b and 17c and 17d and 17e are spaced from each other and from end lugs 17a and 17f by arcuate portions 18. The portions 16a and 16b are adapted to flex relative to each other and as shown in FIG. 3 can be snap fitted within a bore of a cylindrical handle 19 having corresponding portions within the bore to locate the shoulders formed by the lugs 17.

The head 12 is of generally rectangular section with parallel upper and lower walls 20 and 21 and curved side walls 22 and 23. As shown in FIG. 1 the tip 24 of head 12 is slightly curved between the walls 22 and 23 and of pronounced curvature between the walls 20 and 21 as shown in FIG. 2. As also shown in FIG. 2, the thickness of the head between the walls 20 and 21 increases from its tip 24 rearwardly.

Projecting outwardly from the periphery of the head 12 are ten rows 13a to 13j of individual bristles 25, the rows extending longitudinally of the brush head in a spoke-like formation around the periphery of the head 12. The bristles in the rows 13a and 13b and 13f and 13g are arranged parallel to each other and each row extends outwardly at right angles from the respective side wall 20 and 21 of the head 12. The bristles in rows 13a and 13g and 13b and 13f are aligned with each other as shown in FIG. 3. Rows 13d and 13i are also aligned and respectively extend outwardly from the side walls 22 and 23 of the head 12 at right angles to the bristles in the rows 13a, 13b, 13f and 13g. Rows 13c and 13j also extend outwardly and at an acute angle to side wall 20, row 13c being located between rows 13b and 13d and row 13j between rows 13a and 13i. Similarly rows 13e and 13h extend outwardly from and at an acute angle to side wall 21, row 13e being located between rows 13d and 13f and row 13h being located between rows 13g and 13i.

As shown in FIGS. 1 and 2 each bristle 25 in each row is defined by a flat face 26 and an arcuate surface 27 both of which extend longitudinally of the bristle 25, the flat face 26 of each bristle being aligned with the longitudinal axis of the head 12. The length of the bristles 25 in each of the rows 13 decreases from the end of the head to its tip 24.

Referring to FIG. 4, the cross-sectional area of each bristle 25 tapers inwardly from its base 26 to its tip 27.

Referring to FIGS. 5 and 6 the mould 28 comprises ten mould portions 28a and 28j. Mould portions 28a to e form a lower half 29 to the mould 28 and mould portions 28f to j form an upper half 29 to the mould 28. The portions in each half of the mould 28 are held together after assembly by bolsters (not shown).

The ends 31 to 35 and 36 to 40 of the two-half moulds 29 and 30 each define recesses for forming the brush head cavity 12 when the mould halves 29 and 30 are assembled together. Mould portions 28a, b, d, e, f, g, i and j have side surfaces extending away from their ends at an acute angle to each other, while mould portions 28c and 28h have a plate-like shape with parallel side surfaces. The mould portions 28a and 28e each have longitudinally extending horizontal surfaces 60 and 61 provided with grooves 41 and 42 for forming rows of bristle cavities with the flat longitudinally extending horizontal surfaces 62 and 62 of portions 28j and 28f respectively, the grooves 41 and 42 extending from the ends 31 and 35 respectively of the portions 28a and 28e. Similarly mould portions 28b, 28d, 28g and 28i are each provided with longitudinally extending vertical surfaces 64, 65, 66 and 67 having grooves 43 to 46 extending from their ends 32, 34, 37 and 39 respectively so as to define bristle cavities with the flat longitudinally extending vertical surfaces 68 and 69 and 70 and 71 of portions 28c and 28h respectively. In addition mould portions 28b, 28d, 28g and 28i are provided with longitudinally extending sloping flat surfaces 72, 73, 74 and 75 having grooves 47 to 50 respectively extending from ends 32, 34, 37 and 39 and defining bristle cavities with flat longitudinally extending sloping surfaces 76, 77, 78 and 79 of portions 28a, 28e, 28f and 28j respectively.

As shown more clearly in FIG. 5 mould portion 28c comprises a plate portion 51 which is movable vertically between the two adjacent mould portions 28b and 28d and a cylindrical piston portion 52 connected to the plate portion 51 for moving the plate portion 51. The adjacent surface of portions 28b and 28d are provided with part semi-circular grooves 53 and 54 formed with part half-conical shoulders 55 and 56. The grooves 53 and 54 define after assembly a part cylindrical bore in which the piston 52 can move and the shoulders 55 and 56 a part conical shoulder to provide a seat for the shoulder 57 of the piston 52 to limit its extent of travel in the bore. While not shown the mould is provided with a channel or sprue between two adjoining mould portions 28 communicating with the head cavity for the injection of synthetic plastics material thereinto. While also not shown the mould portions 28 are also provided with suitably shaped ends for forming the stem cavity.

In use, the mould is assembled in the form shown in FIG. 5 and molten plastics material is injected into the head cavity and flows into the stem and bristle cavities to form the brush 10.

After solidification, the upper mould half 30 is removed from the lower mould half 29, as shown in FIG. 7, the solidified brush remaining in the lower mould half 30. Piston 52 is then moved forward and pushes the brush 10 outwardly from the lower mould half 20. The brush 10 can then be removed from the plate portion 51 of mould portion 28c.

While not shown it will be appreciated that the upper mould half 29 can be fabricated in one piece with a recess solely for forming a brush head cavity and stem. In this case therefore a brush head will be formed with bristle rows only extending over an arc of 180°.

The formation in the mould 28 of a brush head 10 with two parallel vertical rows of bristles in the upper and lower halves of the mould through the provision of the plate-like mould portions 28c and 28h enables the brush 10 to be removed from the mould halves relatively easily.

Referring to FIGS. 8 and 9 the brush element 100 comprises a central boss 101 with an elliptical surface and a square central bore 102, the transverse opposed faces of the boss 101 being flat. Ten bristles 103a to j are integral with and project outwardly from the periphery of the boss in a spoke-like formation over an arc of 360°. Bristles 103a and 103b form a pair and are arranged parallel to each other, extend outwardly from the lower surface 106 of the ellipse and are respectively aligned with a bristle of the bristles 103f and 103g. Bristles 103f and 103g also form a pair of parallel adjacent bristles and extend outwardly from the upper surface 107 of the ellipse. Bristles 103d and 103i are aligned with each other, extend outwardly from opposite side surfaces 108 and 109 of the ellipse and are arranged at right angles to the bristles 103a, b, f and g. Bristle 103c is located between bristle 103b and 103d to which it is closer and at approximately 40° thereto. Similarly bristles 103e, h and j are respectively located between bristles 103d and 103f, 103g and 103i and 103i and 103a, closer to the bristle on the side surface than that on the upper or lower surfaces and at an angle of approximately 40° thereto.

Referring to FIG. 8, each bristle 103 is defined by a flat face and an arcuate surface both of which extend longitudinally of the bristle 103, the flat face of each bristle being aligned with its neighbour and arranged parallel to the transverse faces of the boss 101. As shown in FIG. 8 the cross-sectional area of each bristle 103 tapers inwardly from the periphery of the boss 101 to its tip.

Referring to FIG. 9 a brush handle 112 of suitable plastics material is provided, the handle 112 having portion 113 in the form of an ellipse and an integral stem 114 extending from the portion 113 and of square section. the shape of the square stem 114 corresponds exactly to that of the bore 102 so that the elements 100 can be fitted over the stem 114 and engaged securely therewith. The elements 100 are pushed to the end of stem 114 connected to the portion 113 so that the end element 100 can abut against the portion 113. The elements 100 are then pushed tightly against each other so that adjacent boss surfaces abut each other. When almost the whole length of the stem 114 is occupied by the elements 100, the free end (not shown) is deformed so as to form an end stop abutting the adjacent boss surface of the end element and a retainer for the elements.

Referring to FIG. 10 the mould 111 for forming an element 100 comprises three portions 115, 116 and 117 which are clamped together to define a cavity 118 for forming a central boss 101 and cavities 119 (only two shown) communicating with the cavity 118 for forming bristles 103.

A first mould portion 115 is provided with a square bore in which is slidably located a second mould portion 116 also of square section corresponding in shape to that of the bore 102 in the boss 101. The first mould portion 115 has a surface provided with an elliptical recess 118a corresponding in shape to half the width of the boss 101, the second mould portion 116 being slidable centrally through the recess 118a. Extending from the periphery of recess 118a are ten grooves 119 (only two shown) in the surface 121, the grooves 119 corresponding to the ten bristles 103 extending from the periphery of the element boss 101.

A third mould portion 117 is provided with a surface 122 also having an elliptical recess 118b corresponding to the other half of boss 101, the remainder of surface 122 being flat. The surfaces 121 and 122 are engaged by clamping the mould portions 115 and 117 together so as to form the cavities 118 and 119 mentioned above.

The second mould portion 116 is then slid so that its end engages the elliptical surface of recess 118b. While not shown, either one or other of mould portions 115 or 117 may be provided with a channel or sprue communicating with the recess 118a or 118b to inject molten plastics thereinto. Preferably, while not shown, the engaging surfaces 121 and 122 are provided with grooves communicating with the recesses 118a and 118b, which grooves when the surfaces 121 and 122 are engaged form a channel or sprue for the injection of molten plastics. To remove the element, the clamp is removed and mould portions 115 and 117 are disengaged, mould portion 116 is removed and the element is pried out.

While not described it will be appreciated that an element having bristles 103 occupying only a 180° arc can be produced by omitting certain grooves 120 from the mould portion 115 for instance those grooves which normally form cavities producing bristles 103e, f, g and h can be omitted to produce an element having only bristles 103a, b, c, d, i and j arranged over a 180° arc.

Indeed both for the brush described with reference to FIGS. 1 to 7 and for the element the moulds can be adapted to produce a brush or element with bristle rows or bristles arranged in any arc between 180° and 360°.

It will be appreciated that the moulds described with reference to FIGS. 6, 7 and 10 are relatively simple and cheap to manufacture since there are no expensive and time consuming bristle cavity boring operations involved in their manufacture as is the case with the production of conventional moulds.

It is a fairly simple operation to machine grooves into flat surfaces and these will form bristle cavities with adjoining flat surfaces.

Furthermore fine bristle brushes can be produced without recourse to the conventional mould bore pins and the accompanying pin removal equipment.

Various other modifications are posssible within the scope of the invention. For example, means other than the injector element 28c could be provided for ejecting the brush from the mould. Also, the grooves defining the bristles of the brush may be arranged otherwise than as shown. For example, the grooves 50 in the member 28i could instead be provided in the member 28j and similar remarks apply to the grooves in the other members.

I claim:

1. A method of injection molding at least a part of a brush including a stem and a plurality of rows of bristles extending longitudinally along the stem, the bristles in at least one row extending outwardly from the stem at an angle which is different than the angle at which the bristles from at least one other row extend from said stem, said method comprising the steps of clamping a plurality of mold pieces together in mold defining positions to form a mold defining the said at least part of a brush and in which each bristle forming cavity is defined by the juxtaposed surfaces of at least two separate mold pieces, injecting molten material into the mold to fill the mold including all of the bristle forming cavities therein, permitting the molten material to solidify, and opening of the mold by separating at least one set of mold pieces from at least one other mold piece to permit removal of the molded part of a brush, at least the majority of said mold pieces being retained in their said mold defining positions relative to each other during ejection molding and removal of the said molded part of a brush, and, when needed, separating the mold pieces defining any bristle forming cavity for purposes of cleaning foreign material therefrom.

2. A method according to claim 1, further comprising the step of providing an ejector rod in which at least a portion functions as a mold piece during molding and is moved relative to its adjacent mold pieces from its mold defining position to a molded part removal position for effecting removal of a molded piece upon opening of the mold.

3. A method according to claim 1 or 2, wherein at least one of each of the said juxtaposed surfaces forming each bristle forming cavity is a flat surface.

4. A mold for injection molding at least part of a brush having a stem and a plurality of rows of bristles extending longitudinally along the stem, the bristles in at least one row extending outwardly from the stem at an angle which is different than the angle at which the bristles from at least one other row extend from said stem, said mold comprising a plurality of mold pieces which form bristle forming cavities for molding of the individual bristles, each bristle forming cavity being defined by the juxtaposed surfaces of at least two separate mold pieces, clamping means for clamping the said plurality of mold pieces together in mold defining positions to form a mold for injection molding of said at least part of a brush, said clamping means retaining at least the majority of said mold pieces in their said mold defining positions during removal of the molded part of a brush, at least a portion of one of the mold pieces defining an ejector rod and being movable relative to its adjacent mold pieces for sliding a molded part of a brush out of engagement with the mold to simplify its removal from the mold, and means for releasing said clamping means to separate the juxtaposed surfaces defining any bristle forming cavity for cleaning any said bristle forming cavity.

5. A mold according to claim 4, wherein said ejector rod engages with a longitudinal portion disposed between two rows of bristles of the said molded part of a brush.

* * * * *